US006232395B1

(12) United States Patent
Sun et al.

(10) Patent No.: US 6,232,395 B1
(45) **Date of Patent: *May 15, 2001**

(54) INKS AND TREATING LIQUID MIXTURE

(75) Inventors: Jing Xian Sun; Ajay Kanubhai Suthar, both of Lexington, KY (US)

(73) Assignee: Lexmark International, Inc., Lexington, KY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/146,006

(22) Filed: Sep. 2, 1998

(51) Int. Cl.[7] .................... C08L 37/00

(52) U.S. Cl. .................... 524/548; 524/441; 524/561

(58) Field of Search .................... 428/195, 206, 428/211, 212; 523/60, 61; 524/441, 548, 556, 561

(56) References Cited

U.S. PATENT DOCUMENTS

| | | | |
|---|---|---|---|
| 4,371,582 | 2/1983 | Sugiyama et al. . | |
| 4,382,262 | 5/1983 | Savit | 346/1.1 |
| 4,538,160 | 8/1985 | Uchiyama | 346/140 R |
| 4,554,181 | 11/1985 | Cousin et al. . | |
| 4,702,742 | 10/1987 | Iwata et al. | 8/495 |
| 5,405,678 | 4/1995 | Bilodeau | 428/211 |
| 5,555,008 | 9/1996 | Stoffel et al. | 347/100 |
| 5,623,294 | 4/1997 | Takizawa et al. | 347/98 |
| 5,635,969 | 6/1997 | Allen | 347/96 |
| 5,640,187 | 6/1997 | Kashiwazaki et al. | 347/101 |
| 5,672,392 * | 9/1997 | DeClercq et al. | 427/391 |
| 5,700,582 | 12/1997 | Sargeant et al. | 420/476.6 |
| 5,723,179 * | 3/1998 | Wong et al. | 427/258 |

FOREIGN PATENT DOCUMENTS

| | | |
|---|---|---|
| 0 164 196 | 12/1985 | (EP) . |
| 0 697 445 | 2/1996 | (EP) . |
| 0 709 438 | 5/1996 | (EP) . |
| 0 767 071 | 4/1997 | (EP) . |
| 2 147 003 | 5/1985 | (GB) . |

* cited by examiner

*Primary Examiner*—Bruce H. Hess
*Assistant Examiner*—Michael E. Grendzynski
(74) *Attorney, Agent, or Firm*—John A. Brady

(57) ABSTRACT

Paper to receive inkjet printing has applied to it a mixture of a latex, glycerol, and hydrated aluminum chloride. The latex has predominantly hydrocarbon moieties and a positively charged acryloylammonium salt moiety. The printing realized from an inkjet printer has excellent color richness, black optical density, fast drying time and resistance to water.

6 Claims, No Drawings

INKS AND TREATING LIQUID MIXTURE

FIELD OF THE INVENTION

This invention is a paper treated with a material to improve printing on the paper by aqueous inks, such as inkjet inks.

BACKGROUND OF THE INVENTION

The print performance of current inkjet printers is heavily dependent on the type of plain paper used for printing. The print properties of color richness (gamut), dry time, optical density of black, and water fastness vary from paper to paper. Some papers give excellent results while some are quite poor.

Various treatments of paper with an undercoat to improve the resulting printing by aqueous inks are known in the prior art. This invention employs a latex-based mixture. U.S. Pat. No. 5,405,678 to Bilodeau is to a latex-based mixture for this purpose, but not employing other elements of this invention.

DISCLOSURE OF THE INVENTION

A latex of predominantly hydrocarbon polymers exhibiting a glass transition temperature near normal room temperature and having a positively charged moiety is mixed with a polyol as the predominant vehicle. The mixture is applied to paper prior to printing from a water-based ink. The resulting paper is dry to the touch without a separate drying step and forms a film without a separate heating step.—The term paper with respect to this invention is meant to describe any unitary mat or web of organic fibers as a sheet suitable for printing of text or images by a liquid aqueous ink.

The printing realized by standard office inkjet printers, such as the 7000 printer sold by the assignee of this invention, is exceptionally good, including excellent color richness, black optical density, time of drying, and resistance to water.

DESCRIPTION OF THE PREFERRED EMBODIMENTS

The latex of this embodiment contains three types of ingredients. First is a low glass transition temperature (Tg) monomer (soft monomers) such as butyl acrylate or ethyl acrylate. This type of soft monomers will help the film formation properties of the latex. The second type of monomer is the high Tg monomers such as styrene or methacrylate. This type of monomers will help bring the Tg of the latex near room temperature therefore, help the latex stability. The third type of monomers contains positive charges such as acryloyloxyethyltrimethylammonium methyl sulfate, acryloyloxyethyl(4-benzoylbenzyl)dimethylammonium bromide, methacryloylaminopropyltrimethylammonium chloride, methacryloyloxyethyltrimethylammonium chloride or methyl sulfate. A combination of these types of materials form a positive charge layer on the surface of the latex, and charges can interact/precipitate the colorant of the ink printed above the undercoated latex layer.

Cationic surfactant such as alkyltrimethylammonium chloride is used in the latex synthesis with the azo initiators such as V-50 from Wako Co. A general latex synthesis procedure is as follows:

A pre-emulsion containing 1.2 g hexadecyltrimethylammonium chloride, 18 g DI water, 28 g butyl acrylate, 40 g styrene, 22 g acryloyloxyethyltrimethylammonium methyl sulfate and 0.3 g V-50 is pre-mixed. To a three-neck round bottom flask equipped with mechanical stir, thermometer and pressure equalized additional funnel, 0.2 g hexadecyltrimethylammonium chloride, 50 g DI water, 0.3 g V-50 and 18 g of the pre-emulsion is added. The flask is degassed and back-filled with nitrogen, then heated to 75 to 80° C. with good stirring. After the reaction is initiated, the mixture continues to stir for another 20 minutes, then the rest of the pre-emulsion is dropped in. Portions of initiator are added every hour period for three or four times, then the reaction is stirred at 80° C. overnight to complete. The formed latex is cooled to room temperature through air flow, filtered through the nylon cloth. The particle size of the latex is about 100 to 300 nm, and the surface tension is about 49 to 60. The resin of this latex is a random trimer of the butylacrylate, the styrene and the acryloyloxyethyltrimethylammonium methyl sulfate.

Such latexes are then combined with humectants and penetrants to achieve a desired viscosity, surface tension, and flocculant properties suitable for the type of coating method and coat weight. An effective flocculent such as hydrated aluminum chloride combines with the cationic latex to enhance effectiveness of the latex composition with respect to pigments in ink. Similarly, the latex, because of its charge, flocculates dyes in inks. A mixture which shows very good promise under dye based inks, pigmented black, and pigmented color inks is as follows:

| | By Weight |
|---|---|
| Glycerol | 50% |
| Aluminum chloride $6H_2O$ | 10% |
| Latex (as foregoing) | 15% |
| Deionized water | 25% |

This material is applied to the surface of paper to receive printing, preferably as a light, gentle spray, but techniques of the coating art, in particular, roller coating, may be employed. The amount is about 100 to 200 milligrams per 8½×11 inch page. The glycerol is understood to largely move away from the page surface. The water is understood to simply evaporate.

Since the amount coated is very small, the effectiveness drops quickly with time as the material soaks into the paper. Excellent printing is achieved by coating the material near or in the printer within a few minutes of applying the latex mixture. Applying such a small amount avoids problems with cockle and drying.

Other variations will be apparent or may be anticipated.

We claim:

1. A liquid mixture for application to a surface to precipitate pigment inks onto said surface comprising (1) a polymeric latex of a random polymer of (a) an alkyl acrylate selected from the group consisting of ethyl acrylate, butyl acrylate, and homologues thereof; (b) styrene, and (c) a positively-charged monomer; (2) a metal salt as a precipitant; and (3) a liquid vehicle of more than 50 percent by weight polyol based on the total weight of said vehicle.

2. The liquid mixture as in claim 1 in which said positively charged monomer comprises an acryloylammonium salt and said latex comprises a cationic surfactant.

3. The liquid mixture as in claim 1 in which said polyol is glycerol of about 50 percent by weight of said mixture.

4. The liquid mixture as in claim 1 in which said metal salt is hydrated aluminum salt.

5. The liquid mixture as in claim 2 in which said metal salt is hydrated aluminum salt.

6. The liquid mixture as in claim 3 in which said metal salt is hydrated aluminum salt.

* * * * *